US009647969B2

(12) United States Patent
Gary et al.

(10) Patent No.: US 9,647,969 B2
(45) Date of Patent: *May 9, 2017

(54) EMAIL AS A TRANSPORT MECHANISM FOR ACTIVITY STREAM POSTING

(71) Applicant: INTERNATIONAL BUSINESS MACHINES CORPORATION, Armonk, NY (US)

(72) Inventors: Jason R. Gary, Clermont, FL (US); Bill Looby, Dublin (IE); Scott H. Prager, Stratham, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,959

(22) Filed: Nov. 15, 2013

(65) Prior Publication Data

US 2014/0280641 A1 Sep. 18, 2014

Related U.S. Application Data

(63) Continuation of application No. 13/800,257, filed on Mar. 13, 2013.

(51) Int. Cl.
H04L 12/58 (2006.01)
H04L 29/14 (2006.01)

(52) U.S. Cl.
CPC ............ H04L 51/08 (2013.01); H04L 51/063 (2013.01); H04L 69/40 (2013.01); *H04L 51/32* (2013.01)

(58) Field of Classification Search
CPC ......... H04L 51/00; H04L 51/16; H04L 51/18; H04L 51/08; H04L 51/046; H04L 51/063; H04L 51/32; H04L 69/40; G06Q 10/107; G06Q 10/101

USPC ........ 709/206, 201–203, 217–219, 230, 227, 709/238; 704/9; 715/751–752
See application file for complete search history.

(56) References Cited

U.S. PATENT DOCUMENTS

| 8,312,381 | B2 | 11/2012 | Jorasch | |
| 2003/0200272 | A1* | 10/2003 | Campise et al. | 709/206 |
| 2006/0098650 | A1* | 5/2006 | Beninato | H04L 12/5835 370/389 |
| 2006/0129602 | A1* | 6/2006 | Witriol et al. | 707/104.1 |

(Continued)

FOREIGN PATENT DOCUMENTS

WO WO2011136822 A1 11/2011

*Primary Examiner* — Abdulkader M Alriyashi
(74) *Attorney, Agent, or Firm* — Moore & Van Allen PLLC

(57) ABSTRACT

A method, system and computer program product for utilizing email as a transport mechanism for activity stream posting. The method, program system, and computer product may include receiving an email, with content, at a target email system of a target from a source email system of a source. Content that is to be posted to an activity stream is extracted from the email content. The extracted content is posted to the activity stream. The method, program system, and computer product may further include examining the email at the target to identify whether the email includes content that is to be posted to the activity stream, or the target email system may deliver the email to a designated email address mailbox assigned to emails containing content to be sent to the activity stream. A notification of the email may be provided or the mailbox may be checked for email.

11 Claims, 2 Drawing Sheets

(56) References Cited

U.S. PATENT DOCUMENTS

| | | | |
|---|---|---|---|
| 2008/0005284 A1* | 1/2008 | Ungar | H04L 12/1859 709/219 |
| 2008/0172467 A1* | 7/2008 | Zintel et al. | 709/206 |
| 2009/0013043 A1* | 1/2009 | Tan | 709/205 |
| 2011/0078167 A1* | 3/2011 | Sundaresan et al. | 707/765 |
| 2011/0078262 A1* | 3/2011 | Michelman | 709/206 |
| 2012/0089690 A1* | 4/2012 | Hein | G06Q 10/10 709/206 |
| 2013/0204952 A1* | 8/2013 | Everton et al. | 709/206 |

* cited by examiner

EMAIL AS A TRANSPORT MECHANISM FOR ACTIVITY STREAM POSTING

CROSS-REFERENCE TO RELATED APPLICATION

This application is a continuation of U.S. patent application Ser. No. 13/800,257, filed Mar. 13, 2013, the contents of which are hereby incorporated by reference in their entirety.

BACKGROUND

Aspects of the present invention relate to communication of events between or within one or more computer systems, and more particularly to a method, system, and computer program product for transport of information or data via email to be posted in an activity stream.

An activity stream may be considered to be an ongoing flow of relevant events scoped to a person, topic, project, or otherwise. Activity streams are becoming a more common mechanism in software services, particularly social systems (e.g., Facebook® (FACEBOOK is a registered trademark of Facebook, Inc.), IBM Smart Cloud for Social Business, etc.). Current mechanisms require direct interaction between the event source and the event feed, where either the event source pushes events to the activity stream via defined Application Programming Interfaces (APIs) or the activity stream pulls events from the source via a feed-like method. There are a set of scenarios, though, where these methods are lacking, for example, when the source is unable to reach the stream through normal access such as may be the case when behind a firewall or otherwise unavailable for web-based access, when the stream does not have open or standard interfaces, when synchronous interaction is not possible, and when the source is older and potentially unmodifiable code. In such cases, an alternate method of transport for events is desirable.

BRIEF SUMMARY

According to one aspect of the present invention, a method is provided for utilizing email for activity stream posting. The method includes receiving, by a processing device, an email, which includes content, at a target email system of a target from a source email system of a source. Content that is to be posted to an activity stream is extracted from the email, by a processing device, content. The extracted content is posted, by a processing device, to the activity stream.

According to another aspect of the present invention, a system for utilizing email for activity stream posting is provided. The system includes a processor and a module for utilizing email for activity stream posting. The module includes a module for receiving an email, which includes content, at a target email system of a target from a source email system of a source, a module for extracting from the email content that is to be posted to an activity stream, and a module for posting the extracted content to the activity stream.

According to a further aspect of the present invention, a computer program product for utilizing email for activity stream posting. The computer program product includes a computer readable storage medium having computer readable program code embodied therewith, and that includes computer readable program code configured to receive an email, which includes content, at a target email system of a target from a source email system of a source. The code further includes computer readable program code configured to extract from the email content that is to be posted to an activity stream, and computer readable program code configured to post the extracted content to the activity stream.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
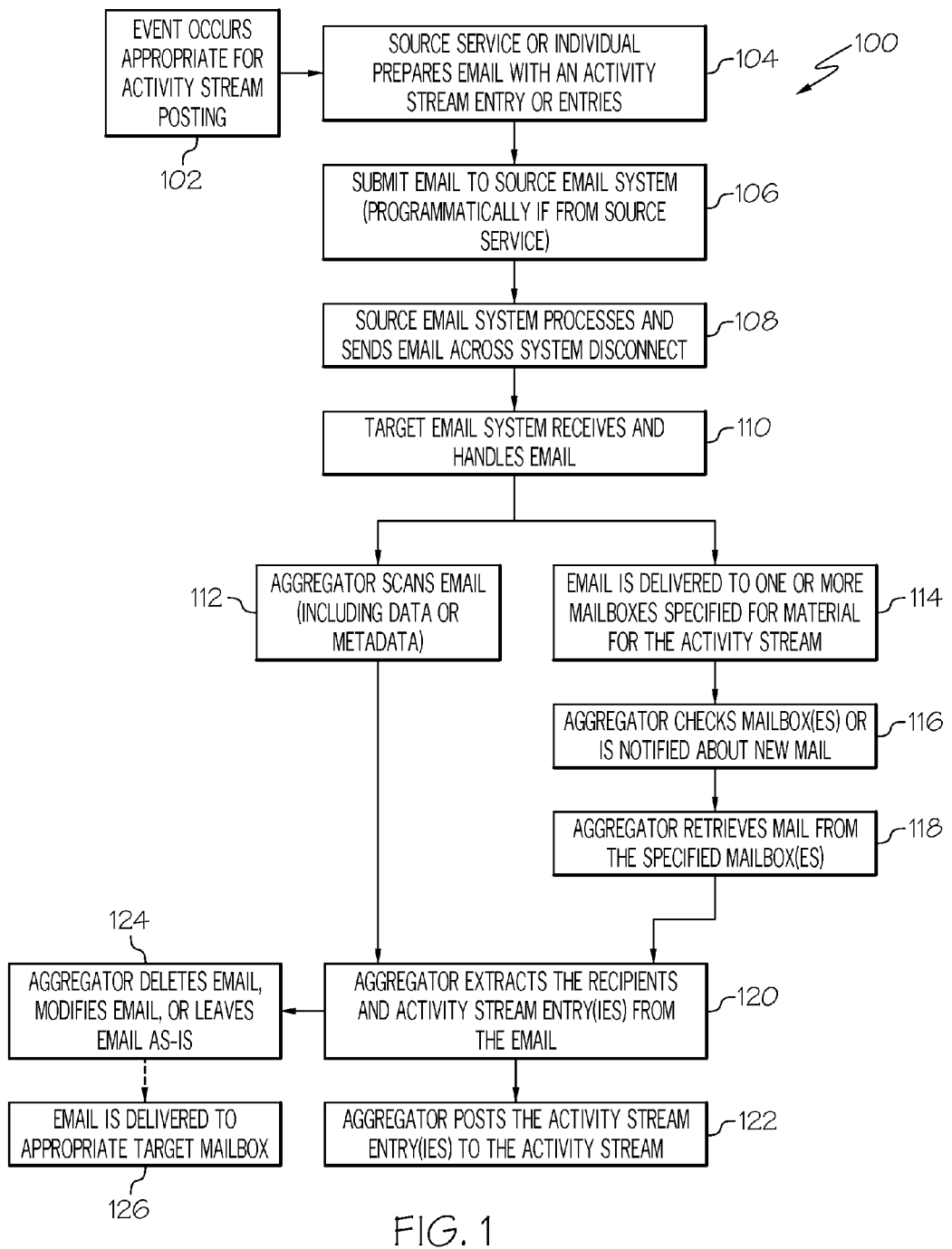
FIG. 1 is a flowchart of an example of a method for utilizing email for activity stream posting in accordance with an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments disclosed herein leverage the capabilities of email, a ubiquitous and existing form of transport, allowing older or otherwise unconnected systems to communicate indirectly through email as the transport mechanism. For older or closed systems, the commonality and nearly universal enablement for email makes it a viable alternative for pushing events from a source to an activity stream. This is also effective when the activity stream may have limited availability for a variety of reasons, since email is an asynchronous medium. Such use of email may also provide integration with existing compliance or backup systems already set up for email when they are not available for activity streams. Accordingly, the features of email of addressability, universal connectivity and asynchronous delivery, and depending on the method of scanning, possibly storage may be beneficial to its use.

In some embodiments, an indication that content of an email is intended for posting to an activity stream is included in the email to trigger handling by the target, which is subject to the activity stream system. These emails may be identified as may occur through scanning incoming emails or by having a dedicated batch-processed stream-specific email address to which the emails may be sent. When a relevant email is identified, the corresponding activity stream entry may be created using information from the email and potentially additional information from an available repository. Depending on settings at the target, the email may then be deleted, modified, or left untouched and saved. In this way, the email transport may be used as a mechanism for delivering activity stream events/entries from a source system (or any number of source systems) to the activity stream system.

FIG. 1 shows two embodiments of a method 100 for posting an event to an activity stream. First, at block 102, an event, which may be an action as one example, occurs against or within the source service that warrants posting to the activity stream system. This action is represented by a set of fields in accordance with the requirements of a general activity stream, which may be, for example, based on the activity stream's specification. This information for an event may include an actor, verb, and object indicating who did what to what, who will do what when, and so forth, or alternatively could be announcements, statements, or the like. The data itself will be represented by, for example, an Atom, JSON, or other representation, which may be a standardized data format. In a conventional system this event would be posted directly to the aggregator or saved for later direct retrieval by the aggregator.

Next, a source service prepares an email 104, or an individual does so with a computer system, and if a source service, submits it programmatically 106 to the source email system. A source service may be a system that has the event that is appropriate for the activity stream. As one example, in a business social network, a purchase may be approved in a workflow system. The approval could be the event that would be encoded into an email. Other examples of events may include, but not be limited to, a news story, travel request, or ecommerce purchase as an event, and may also be implemented in consumer social networks as well as other networks and systems. The addressing and content of this email depends on the specific mechanism being used for passing the information and event, described in more detail below. The specific address can be known or composed by the source service or looked up dynamically as needed from an internal or external registry. For efficiency, multiple events could be packaged into a single email message through the same methods described here. In block 108, the source email system processes the request to send the email in a like manner as other email, and the email may be sent literally or functionally across a system disconnect before reaching a target. The system disconnect may be, for example, an imposed impediment such as a firewall, or something else that prevents directs communication from the source service or individual's computer system to the aggregator, such as being unavailable for web-based access, when the stream does not have open or standard interfaces, when synchronous interaction is not possible, when the source is older and potentially unmodifiable code, or when there are times when a target system is unavailable to the source system (temporal unavailability).

There is, in this embodiment, no specific awareness or consideration of this email message and no specific handling of it between the source email system and the target email system differently than other email messages. In block 110, this email is received by the target email system through standard email delivery and is handled in the same manner as any other email. Depending on the addressing method being used, the email will either be scanned during processing or simply posted to an appropriate target mailbox.

Whether through scanning incoming email or engaging with one or more assigned mailboxes, the aggregator captures the email. Scanning may include examining the email at the target to identify whether the email includes content that is to be posted to the activity stream, in other words, looking at some property of the email for an indication that the email should be processed for the purposes of posting to the activity stream. If through scanning 112, the aggregator may identify keys, such as data or metadata, in the email address or body that indicates that the email includes content intended to be sent to the activity stream. Examining may also include parsing the email and finding one or more predetermined specific fields, keywords, format, tags, attachments, or any combination thereof to identify the content of the email that is to be sent to the activity stream, or parsing the email and performing natural language processing according to predetermined criteria to identify the content of the email that is to be sent to the activity stream. Alternatively, if through delivery in one or more particular designated mailboxes 114 that may have as a sole or significant purpose being a storage location for receiving emails with content intended for activity stream posting, the aggregator either periodically checks one or more mailboxes or is notified about the new mail 116 and retrieves it from the mailboxes 118.

Following blocks 112 or 118, as the case may be, in block 120, the aggregator extracts the recipient(s) and activity stream entry (or entries) from the email message and processes them as it would conventional pulled entries submitted directly to the aggregator. In block 122 the aggregator posts the activity stream entry to the activity stream. Examples of an activity stream 116 may include a social networking feed, a collaborative work project, a news feed, and so forth. In block 116 the aggregator may delete the mail message, modify it, simply leave it as is, or store or archive it in a designated file associated with the activity stream. If the email was scanned in block 124, which may be during the delivery, the email is subsequently delivered to an appropriate target mailbox in block 126. Alternatively, the scanning could take place after the delivery of the email to the appropriate target mailbox.

In greater detail, there are at least three methods for addressing of emails. In a first method, email may be addressed to the target user or users who are being notified of the event. In such a case, emails would be scanned as they pass into or through the recipient email system to ensure processing. A particular item of data or metadata in the email would trigger processing by the aggregator. In addition, the aggregator might delete, modify or leave untouched the email itself, depending on whether it is desired to have the notification also exist in email. This could be done based on properties in the email or on configuration settings in the aggregator.

In a second method, email may be addressed to a single target mailbox reserved for the aggregator. In such a case, the aggregator would either scan this inbox periodically or be notified of new items delivered. Indication of the recipient(s) could be obtained from plain text or hash tag, perhaps in the subject line or perhaps elsewhere. Each email would be then be processed and deleted.

In a third method, email may be addressed to one or more of a set of target mailboxes available to the aggregator but not intended for end-user usage. These mailboxes could be associated with a user, a group, an event source, or otherwise segregated, and might also be used by other services for processing. Each item would be processed as in the single mailbox case, although the specific mailbox used might provide additional context for handling or directing the activity stream.

One way of handling of the content of emails is as follows. The relevant fields for the email can be passed in any form, and as visible or invisible fields, as long as the content is available. The email could even simply be used to refer back to another source to obtain event information. If this email is intended for delivery to the target user as well, the relevant fields could be removed from the email if desired. Additional information needed (for example, the gadget to leverage for an embedded experience) could be obtained by looking in a repository within or external to the organization. The gadget, as one example, may be a User Interface (UI) widget such as an OpenSocial Gadget. In such an example, one email may not include all information needed for the activity stream posting, but data may be extracted from the email to perform a separate lookup of additional data that is to be added to the activity stream posting. In a specific embedded experience gadget case, which may mean that when an entry is selected in an activity stream UI, a side UI is launched to expand that particular item, with the gadget being the form of that UI, there may be event data for the specific event and a gadget URL to identify the gadget to load for the UI. The gadget URL may be common to all events of this type, so instead of having all of the necessary information included in each email, the gadget URL may be looked up by the target system as the resource for the remaining necessary information.

Multiple events could be batched together, being rolled up such that they are grouped together in one entry in the activity stream, and collectively or individually targeted. The aggregator may be configured to avoid posting of duplicate events, for example, by using assigned event identification designations (event ID) and mail message identification designations (message ID) and/or event titles. Avoiding saving a message may result where an event with the same event ID as the subsequent mail message ID exists, or where an event with an exact duplicate title exists. Threading may be an approach, in which the message ID is used as an object ID. In this way reply messages can be rolled up as comments to an object by looking at the reply to the message ID.

Figure 2:
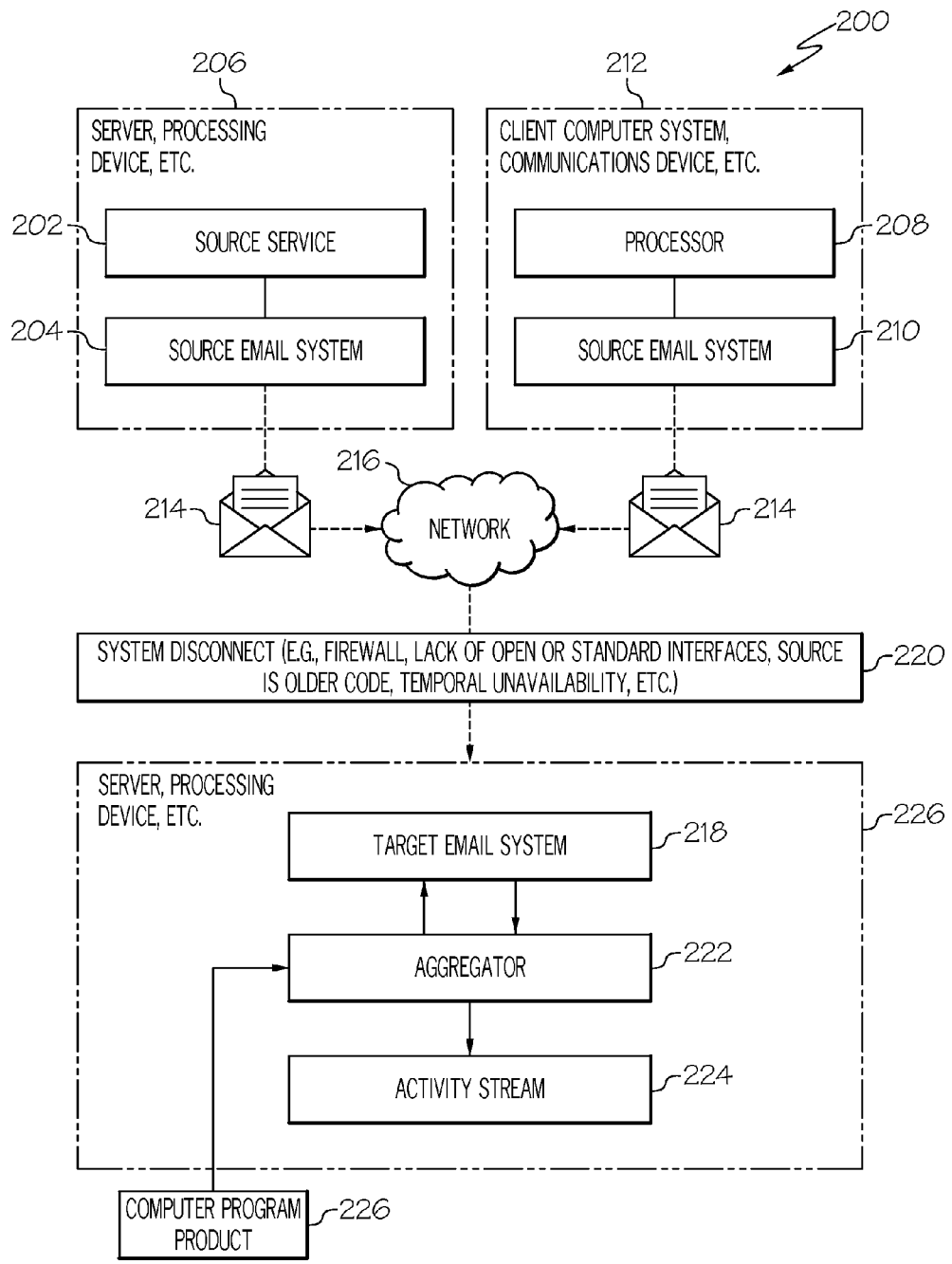
FIG. 2 is a block schematic diagram of an example of a system for utilizing email for activity stream posting in accordance with an embodiment.

FIG. 2 is a block schematic diagram of an example of a system 200 for providing email activity stream transport in accordance with an embodiment. The method 100 of FIG. 1 may be embodied in or performed by the system 200. The system 200 may include a source service 202 and a source email system 204 on a server 206 or processing device and/or a processor 208 and source email system 210 on a client computer system 212 or communications device. The source email systems 204, 210 send emails 214 through a network 216, such as the Internet, an intranet, a wide area network (WAN), local area network (LAN), or other network, to a target email system 218, which necessarily must be reachable by the applicable source email system 204, 210. There may be a system disconnect 220. The email is able to pass through, avoid, or otherwise mitigate the system disconnect 220, if there is one.

The target email system 218, along with an aggregator 222 and activity stream 224, reside on at least one other server 226 or processing device. The target email system 218 is accessed by the aggregator 222, which, as discussed above, accesses the target email system 218 to extract content from the email 214 and posts the content to an activity stream 224.

The servers 206, 226 and computer system 212 include a processor to control operation and a file system, memory, or similar data storage device. An operating system may be stored on the file system for running or operating on the processor. The modules for the source service 202, the source email systems 204, 210, the target email system 218, the aggregator 222, and the activity stream 224 may be stored on a computer readable storage medium or computer program product including a computer readable storage medium similar to that previously described, such as computer program product 226.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for utilizing email as a transport mechanism for social system activity stream posting, comprising:
   receiving, by a source service computer system, content to be delivered to a social system activity stream, the content related to a social system event;
   determining, by the source service computer system, that an imposed impediment prevents direct synchronous interaction between the source service computer system and the social system activity stream;
   preparing, by the source service computer system, responsive to the determining, an email from the content, wherein a destination email address of the email is dynamically determined by the source service computer system;
   programmatically submitting the email to a source email system configured to send the email across the imposed impediment;
   sending, by the source email system, the email to a target email system across the imposed impediment for asynchronous delivery;
   receiving the email at the target email system, the received email including the content related to the social system event;
   processing the received email, by a processing device, wherein processing the received email comprises recognizing metadata indicative of the content related to the social system event and scanning the received email to identify the content related to the social system event that is to be posted to the social system activity stream;
   extracting from the received email, by the processing device, the content related to the social system event that is to be posted to the social system activity stream, wherein the extracting further comprises extracting a gadget identifier;
   obtaining by the processing device, based on the gadget identifier, a gadget from an external repository;
   posting, by the processing device, the content related to the social system event and the gadget to the social system activity stream; and
   presenting, by the processing device using the gadget additional information related to the social system event wherein the additional information is not included in the received email.

2. The method of claim 1, further comprising examining the received email to identify whether the received email includes content that is to be posted to the social system activity stream.

3. The method of claim 2, wherein examining the received email comprises parsing the received email and finding one or more predetermined specific keywords and/or format to identify the content of the received email that is to be posted to the social system activity stream.

4. The method of claim 2, wherein examining the received email comprises parsing the received email and performing natural language processing according to predetermined criteria to identify the content of the received email that is to be posted to the social system activity stream.

5. The method of claim 2, wherein examining the received email comprises recognizing data associated with the received email, the data indicates that the received email includes content intended to be posted to the social system activity stream.

6. The method of claim 1, wherein the received email is an initial email and includes a message ID, and the method further comprising deleting or not saving a subsequent email having the same message ID.

7. The method of claim 1, wherein the received email includes an event ID, and the event ID is used for identifying the content that is to be posted to the social system activity stream.

8. The method of claim 7, wherein the received email is an initial email, and the method further comprising deleting or not saving a subsequent email having the same event ID.

9. The method of claim 1, further comprising deleting or modifying the received email after identification of content to be posted to the social system activity stream.

10. The method of claim 1, further comprising packaging multiple events in a single email message from the source service computer system, the multiple events being posted to the social system activity stream.

11. The method of claim 1, wherein the gadget comprises an OpenSocial gadget.

\* \* \* \* \*